(12) United States Patent
Xiong et al.

(10) Patent No.: US 9,076,221 B2
(45) Date of Patent: Jul. 7, 2015

(54) REMOVING AN OBJECT FROM AN IMAGE

(71) Applicant: QUALCOMM Incorporated, San Diego, CA (US)

(72) Inventors: Yingen Xiong, Mountain View, CA (US); Tao Zhang, Sunnyvale, CA (US); Ning Bi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 67 days.

(21) Appl. No.: 13/945,609

(22) Filed: Jul. 18, 2013

(65) Prior Publication Data
US 2014/0169667 A1 Jun. 19, 2014

Related U.S. Application Data

(60) Provisional application No. 61/739,666, filed on Dec. 19, 2012.

(51) Int. Cl.
| | |
|---|---|
| *G06K 9/40* | (2006.01) |
| *G06T 7/00* | (2006.01) |
| *G06F 3/0482* | (2013.01) |
| *G06F 3/0488* | (2013.01) |
| *G06K 9/46* | (2006.01) |
| *G06T 5/00* | (2006.01) |
| *H04N 1/387* | (2006.01) |

(52) U.S. Cl.
CPC ............ *G06T 7/0081* (2013.01); *G06F 3/0482* (2013.01); *G06F 3/0488* (2013.01); *G06K 9/4609* (2013.01); *G06K 9/4652* (2013.01); *G06T 5/005* (2013.01); *H04N 1/3872* (2013.01); *G06T 2207/20144* (2013.01)

(58) Field of Classification Search
USPC ......... 382/103, 164, 173, 190, 270, 266, 275; 348/61; 715/862, 863
See application file for complete search history.

(56) References Cited

U.S. PATENT DOCUMENTS

| | | | |
|---|---|---|---|
| 6,125,213 A | 9/2000 | Morimoto | |
| 6,987,520 B2 | 1/2006 | Criminisi et al. | |
| 7,162,073 B1 | 1/2007 | Akgul et al. | |
| 7,218,775 B2 | 5/2007 | Kokko et al. | |
| 7,240,300 B2 * | 7/2007 | Jaeger | 715/863 |
| 7,545,995 B2 | 6/2009 | Steinberg et al. | |
| 8,116,527 B2 * | 2/2012 | Sabol et al. | 382/103 |
| 2011/0103706 A1 | 5/2011 | Jeong et al. | |

FOREIGN PATENT DOCUMENTS

WO  WO-2010129705 A1  11/2010

OTHER PUBLICATIONS

International Search Report and Written Opinion—PCT/US2013/074302—ISAEPO—Apr. 3, 2014.

(Continued)

*Primary Examiner* — Anh Do
(74) *Attorney, Agent, or Firm* — Austin Rapp & Hardman

(57) ABSTRACT

A method for removing an object from an image is described. The image is separated into a source region and a target region. The target region includes the object to be removed. A contour of the target region may be extracted. One or more filling candidate pixels are obtained. Multiple filling patches are obtained. Each filling patch is centered at a filling candidate pixel. A filling patch may be selected for replacement.

43 Claims, 10 Drawing Sheets

(56) References Cited

OTHER PUBLICATIONS

A. Criminisi, P. Perez, and K. Toyama, "Object removal by exemplar-based inpainting," in IEEE Conference on Computer Vision and Pattern Recognition (CVPR), vol. 2, Jun. 2003, pp. 721-728 vol. 2.

Y. Xiong, D. Liu, and K. Pulli, "Effective gradient domain object editing on mobile devices," in Asilomar Conference on Signals, Systems and Computers, Nov. 2009, pp. 1256-1260.

\* cited by examiner

REMOVING AN OBJECT FROM AN IMAGE

RELATED APPLICATIONS AND PRIORITY CLAIMS

This application is related to and claims priority from U.S. Provisional Patent Application Ser. No. 61/739,666, filed Dec. 19, 2012, for "SYSTEMS AND METHODS FOR REMOVING AN OBJECT FROM AN IMAGE."

TECHNICAL FIELD

The present disclosure relates generally to electronic devices. More specifically, the present disclosure relates to systems and methods for removing an object from an image.

BACKGROUND

In the last several decades, the use of electronic devices has become common. In particular, advances in electronic technology have reduced the cost of increasingly complex and useful electronic devices. Cost reduction and consumer demand have proliferated the use of electronic devices such that they are practically ubiquitous in modern society. As the use of electronic devices has expanded, so has the demand for new and improved features of electronic devices. More specifically, electronic devices that perform new functions and/or that perform functions faster, more efficiently or with higher quality are often sought after.

Some electronic devices (e.g., cameras, video camcorders, digital cameras, cellular phones, smart phones, computers, televisions, etc.) capture or utilize images. For example, a digital camera may capture a digital image.

New and/or improved features of electronic devices are often sought for. As can be observed from this discussion, systems and methods that add new and/or improved features of electronic devices may be beneficial.

SUMMARY

A method for removing an object from an image is described. The image is separated into a source region and a target region. One or more filling candidate pixels are obtained. Multiple filling patches are also obtained. Each filling patch is centered at a filling candidate pixel.

A contour of the target region may be extracted. The target region may include the object to be removed. The contour may be recalculated at each iteration. A filling patch may then be selected for replacement. The selected filling patch may include the largest number of pixels in a filling patch source region of the selected filling patch. A replacement patch that is most similar to the selected filling patch may be determined. The target region portion of the selected filling patch may be replaced with the corresponding part of the replacement patch.

The replacement patch may be selected to maximize correlation of both color information and texture information between the replacement patch and the selected filling patch. The replacement patch may also be selected to maximize correlation between both grayscale information and gradient information between the replacement patch and the selected filling patch.

The method may be iterated if all target region pixels are not filled. The replacement patch may be determined using a fast best patch matching algorithm. The replacement patch may be determined using one or more components that are weighted, including color information, grayscale information, texture information and gradient information. The components may be weighted corresponding to an edgy image, a smooth image and a normal image. A resolution may be adjusted at one or more iterations of the method.

The source region and the target region may be separated based on a touchscreen input. Separating the source region and the target region may include determining a set of pixels corresponding to a contour of the target region. A contour of the target region may include a decimated set of pixels corresponding to the contour or an upscaled set of pixels corresponding to the contour. The target region may be selected using a user interface that includes a hidden pull-down menu.

An electronic device is also described. The electronic device includes circuitry for separating an image into a source region and a target region. The electronic device also includes circuitry for obtaining one or more filling candidate pixels. The electronic device further includes circuitry for obtaining multiple filling patches. Each filling patch is centered at a filling candidate pixel.

An apparatus is described. The apparatus includes means for separating an image into a source region and a target region. The apparatus also includes means for obtaining one or more filling candidate pixels. The apparatus further includes means for obtaining multiple filling patches. Each filling patch is centered at a filling candidate pixel.

A computer-program product including a non-transitory tangible computer-readable medium having instructions thereon is also described. The instructions include code for causing an electronic device to separate an image into a source region and a target region. The instructions also include code for causing the electronic device to obtain one or more filling candidate pixels. The instructions further include code for causing the electronic device to obtain multiple filling patches. Each filling patch is centered at a filling candidate pixel.

DETAILED DESCRIPTION

Figure 1:
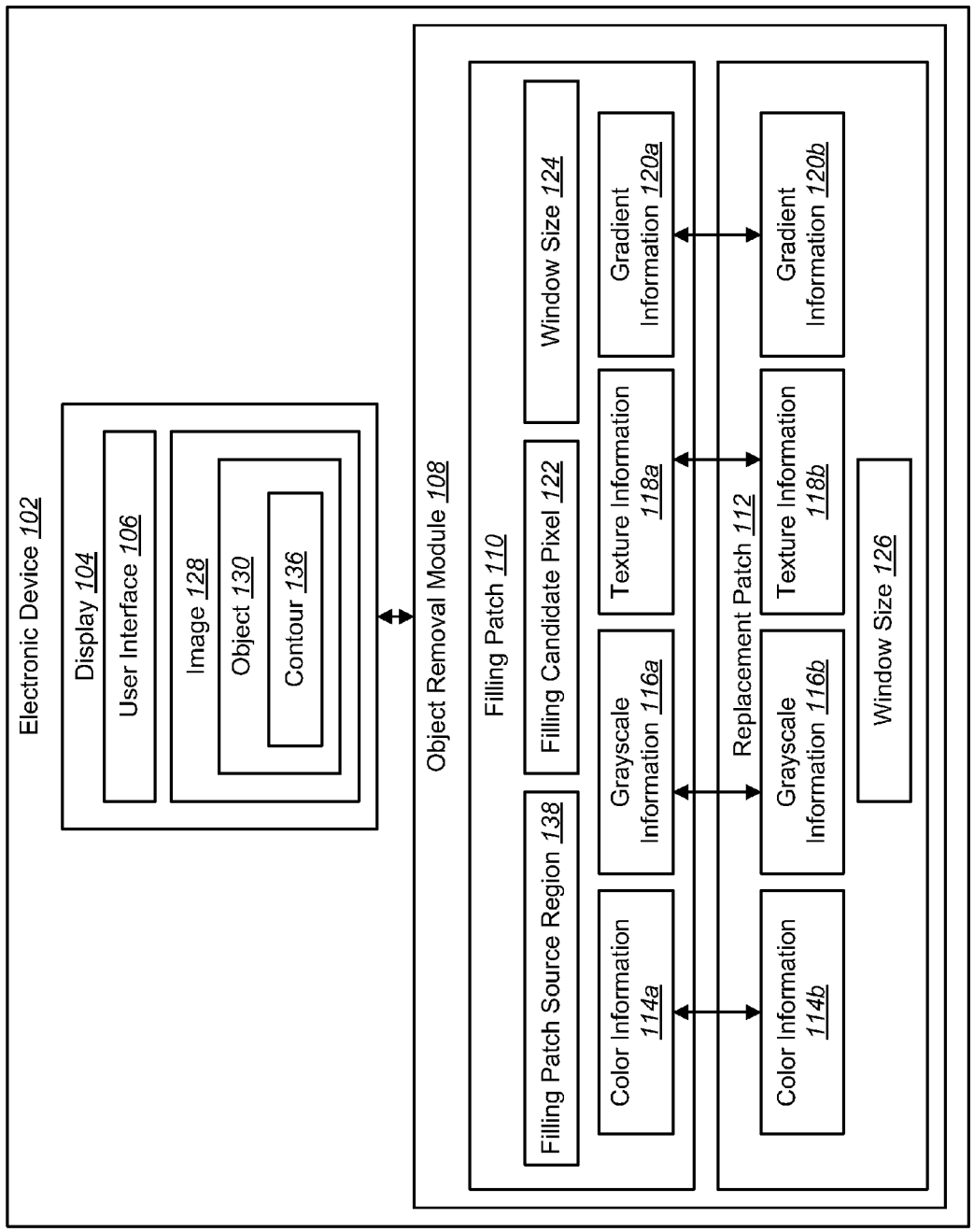
FIG. 1 is a block diagram illustrating one configuration of an electronic device in which systems and methods for removing an object from an image may be implemented.

When people take photos, they may want to edit these photos immediately. For example, they may want to edit the photos prior to leaving a particular location. In one configuration, people may edit photos using the same device that was used to capture the photos (e.g., a camera, a smartphone). The editing may include removing some objects, adding additional objects and changing positions of the objects inside the photo. According to the editing results, the user can also determine whether to retake the photos. Accordingly, on-device and on-site picture processing and editing may be beneficial.

One editing function described above is object removal. Object removal refers to removing unwanted objects from an image (such as a photograph). In particular, selected objects may be removed and the background recovered (i.e., the space behind the object removed). Proper object removal results in an image that appears to have never included the removed object. The systems and methods disclosed herein may also be applied to recover pictures with some damaged areas. One approach may include removing selected objects and creating holes in the object areas. Then, an electronic device may search for best fit patches inside the image and fill the holes.

With a simple texture background (e.g., grass), a person and shadow may be removed from the image and the background area of the grass may be recovered. With a complex texture background (e.g., a sidewalk and building with windows), a person may be removed, while the background area is recovered. Even in cases with a large object in a picture, the large object may be removed and the background may be well recovered.

Some configurations of the systems and methods disclosed herein provide an object removal algorithm and a user interface that provide image editing that may be implemented on mobile devices and may be accelerated with general-purpose graphics processing units (GPGPUs) on open computing language (OpenCL) platforms. These systems and methods can remove objects from the pictures and recover a visually reasonable background. It can make the pictures look like one or more objects were not in the scene when the pictures were taken. Accordingly, the systems and methods disclosed herein provide an algorithm and user interface. Details of the algorithm and user interface are provided below. It should be noted that the term "object" as used herein may denote any region or area of an image.

Various configurations are now described with reference to the Figures, where like reference numbers may indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the systems and methods. It should be noted that the term "set," as used herein, may denote a set of one or more elements.

FIG. 1 is a block diagram illustrating one configuration of an electronic device 102 in which systems and methods for removing an object 130 from an image 128 may be implemented. The electronic device 102 may include a display 104 and an object removal module 108. The display 104 may present a user interface 106. In some configurations, the display 104 may be a touchscreen. The display 104 may also present one or more images 128 for object removal. The user interface 106 is described in greater detail below in relation to FIG. 7.

The electronic device 102 may be a wireless communication device (such as a cellular phone, a personal digital assistant (PDA), a wireless device, or a handheld device), a camera, a laptop computer, a tablet, etc. A wireless communication device may also be referred to as, and may include some or all of the functionality of, a terminal, an access terminal, a user equipment (UE), a subscriber unit, a station, etc. Modern electronic devices 102 have become computational devices equipped with high-resolution cameras to provide high-quality image resources, general-purpose graphics processing units (GPGPUs) to provide more powerful computational capabilities, touch screens to provide more convenience to manipulate applications and high-quality color displays 104. Thus, modern electronic devices 102 provide opportunities to develop applications of computer-vision and computational photography on mobile devices.

An image 128 on the display 104 may include an object 130. The object 130 may refer to a defined area of the image 128 that the user wishes to remove from the image 128. The object 130 may be designated by the user as an area expected to be removed from the image 128. As an example, a user may trace an outline within the image 128 to indicate an object 130 that the user wishes to remove from the image 128. The outline of the object 130 may be referred to as the contour 136 of the object. As the object 130 is removed from the image 128, the contour 136 may be recalculated to include only those areas of the image 128 still marked for removal. The area within the contour 136 is referred to as the target region and the area outside the contour 136 is referred to as the source region.

The object removal module 108 may identify a selected filling patch 110. A filling patch 110 is a portion of the image 128 centered at a filling candidate pixel 122 on the edge of the object 130. A filling patch 110 may include a window size 124 that defines the number of pixels included within the filling patch 110. For example, the window size 124 may be 7×7 pixels, 9×9 pixels, 11×11 pixels, or 17×17 pixels.

The filling patch 110 may include color information 114a, grayscale information 116a, texture information 118a and gradient information 120a corresponding to a filling patch source region 138 of the filling patch 110. The color information 114a, grayscale information 116a, texture information 118a, and gradient information 120a allow the object removal module 108 to select an appropriate replacement patch 112 for the filling patch 110. In one configuration, the replacement patch 112 may have the same window size 126 as the filling patch 110. However, the replacement patch 112 may also have a different window size 126 than the filling patch 110, resulting in an optional scaling of the replacement patch 112 to match the window size 124 of the filling patch 110.

The replacement patch 112 may have color information 114b that corresponds to the color information 114a of the filling patch 110, grayscale information 116b that corresponds to the grayscale information 116a of the filling patch 110, texture information 118b that corresponds to the texture information 118a of the filling patch 110 and gradient information 120b that corresponds to the gradient information 120a of the filling patch 110. Thus, the replacement patch 112 represents a portion of the source region of the image 128 that is a best match for replacing the filling patch 110. A suitable metric may be used in the matching process, such as a sum of squared differences or a normalized cross-correlation. In one configuration, the object removal module 108 may use fast algorithms to determine the replacement patch 112.

Figure 2:
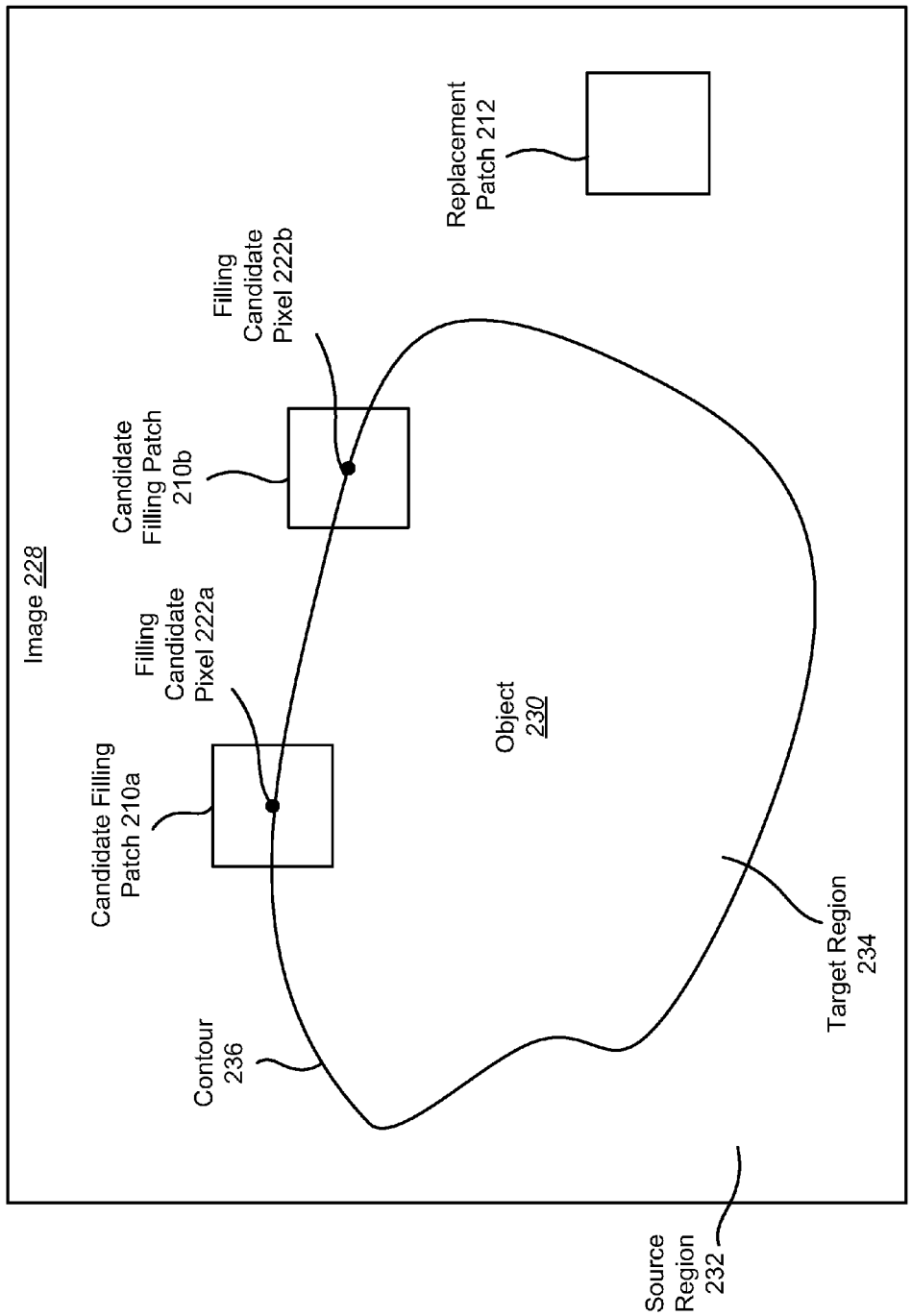
FIG. 2 illustrates an image with an object to be removed.

FIG. 2 illustrates an image 228 with an object 230 to be removed. The object 230 is defined by a target region 234, with all regions outside the target region 234 in the image 228 referred to as the source region 232. Parts of the source region 232 may be used to replace the target region 234 of the object 230. The outline of the target region 234 is referred to as a contour 236. Multiple filling candidate pixels 222a-b are illustrated. Each filling candidate pixel 222 is along the contour 236 of the object 230. In one configuration, an object 230 may include many more than two filling candidate pixels 222.

A candidate filling patch 210a-b is placed around each filling candidate pixel 222, with the filling candidate pixel 222 centered within the candidate filling patch 210. The size of the candidate filling patch 210 is the window size 124. Although the candidate filling patches 210 illustrated are square, other shapes (such as a circle or a rectangle) may also be used.

In one configuration, each candidate filling patch 210 may have the same window size 124. In another configuration, candidate filling patches 210 may each have different window sizes 124. Because a filling candidate pixel 222 is on the contour 236 of the object 230, a portion of each candidate filling patch 210 covers the source region 232 and a portion of each candidate filling patch 210 covers the target region 234. The portion of a candidate filling patch 210a that covers the source region 232 is referred to as the filling patch source region 138. One of the candidate filling patches 210 may be selected as the selected filling patch 110. For example, the candidate filling patch 210 with the most pixels within the source region 232 (i.e., with the largest number of pixels within the filling patch source region 138) may be selected as the selected filling patch 110.

A replacement patch 212 is also illustrated. A replacement patch 212 is selected specific to a selected filling patch 110. The replacement patch 212 may be the best matching patch for the filling patch source region 138 of a selected filling patch 110. The replacement patch 212 may cover only the source region 232 of the image 228 (and not the target region 234).

Figure 3:
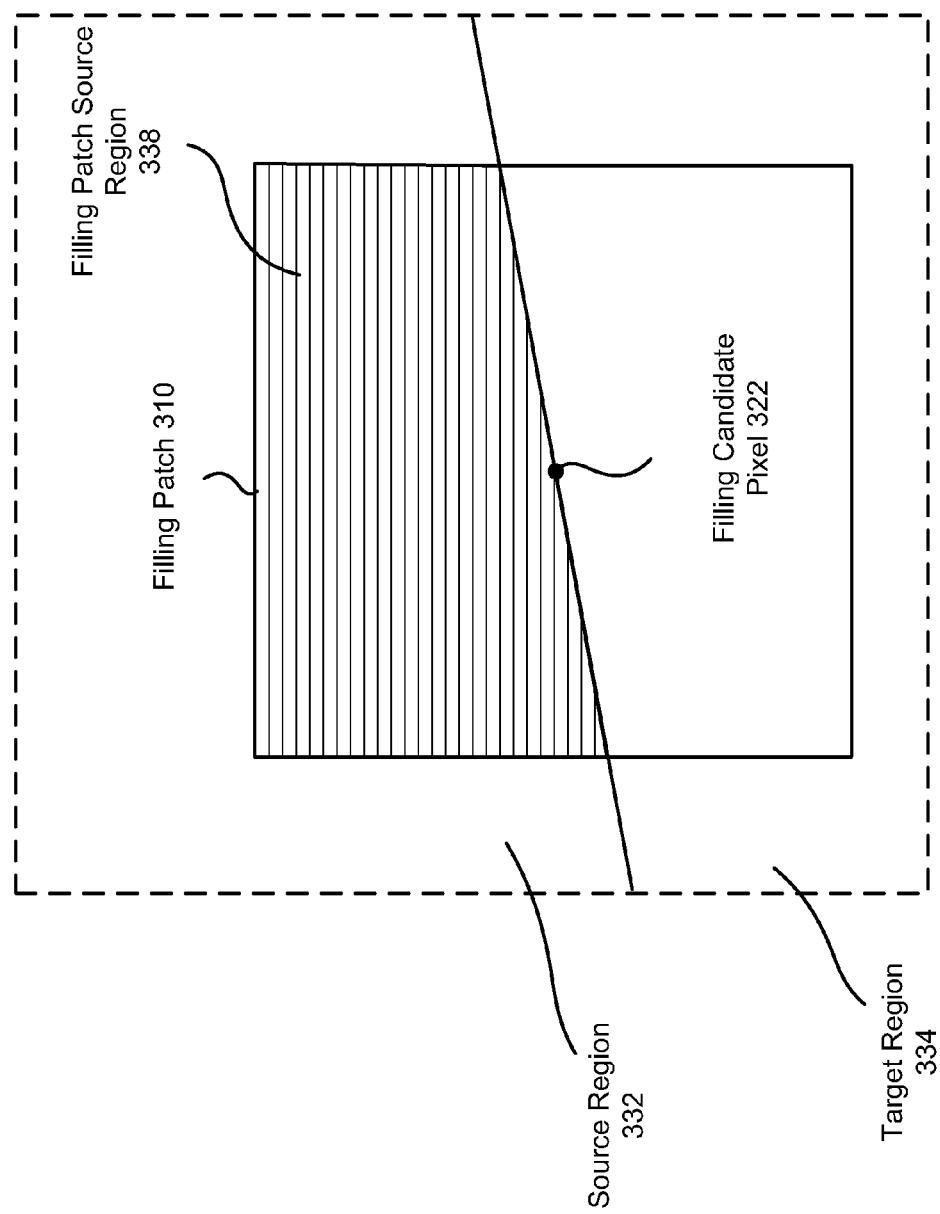
FIG. 3 is a more detailed illustration of a filling patch.

FIG. 3 is a more detailed illustration of a filling patch 310. The filling patch 310 may be centered at a filling candidate pixel 322. The filling candidate pixel 322 may be a pixel on the edge of a target region 334 of an image 228 (i.e., the edge of an object 230 within the image 228). Thus, a portion of the filling patch 310 may cover the target region 334 and a portion of the filling patch 310 may cover the source region 332. The portion of the filling patch 310 covering the source region 332 is referred to as the filling patch source region 338. As discussed above, the filling patch 310 with the largest number of pixels in the filling patch source region 338 is selected as the selected filling patch 310.

Figure 4:
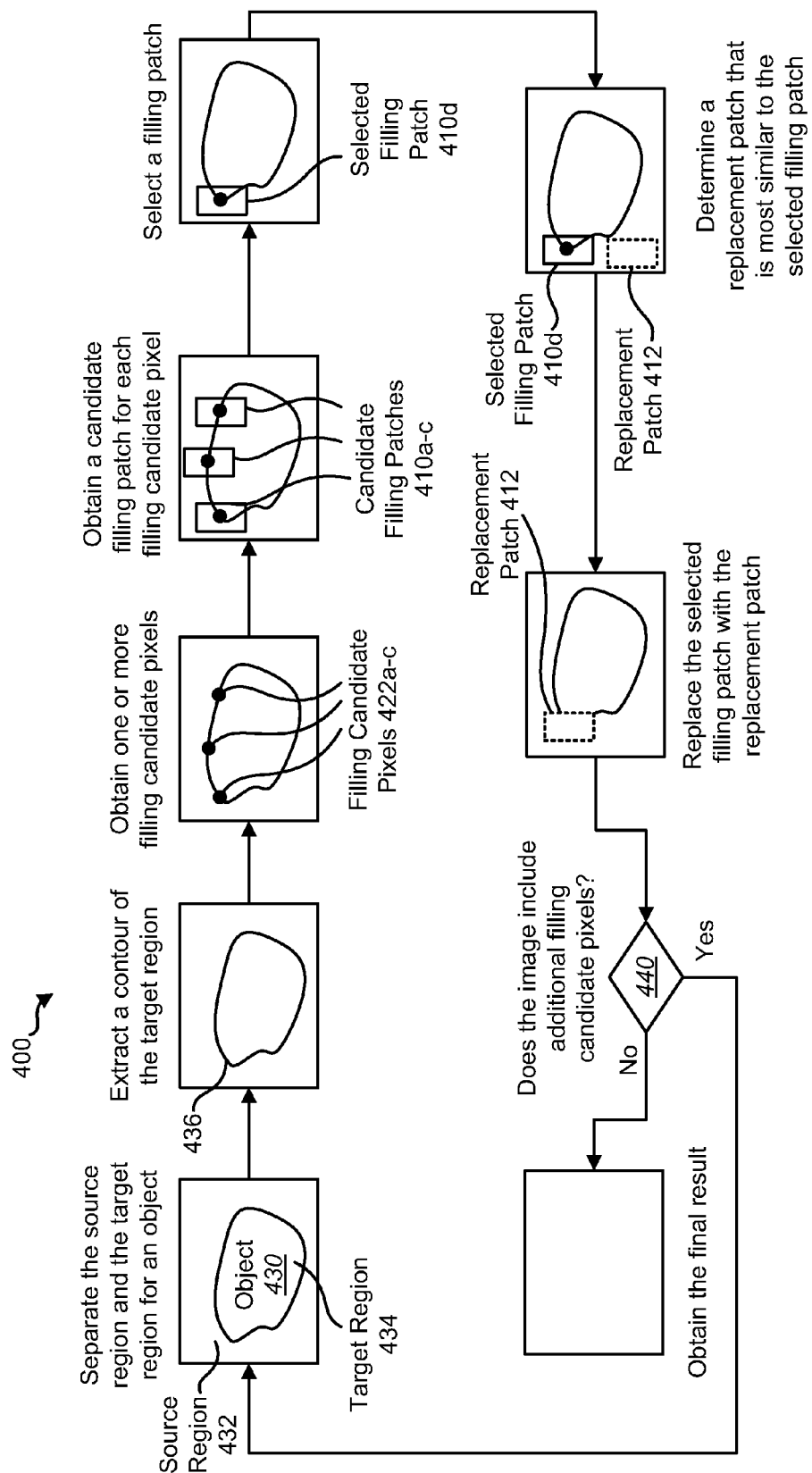
FIG. 4 is a flow diagram of a method for removing an object from an image.

FIG. 4 is a flow diagram of a method 400 for removing an object 430 from an image 128. The method 400 may be performed by an electronic device 102. In one configuration, the electronic device 102 may include an object removal module 108.

The electronic device 102 may separate the source region 432 and the target region 434 for an object 430 in an image 128. For example, a user may use a touchscreen to specify the target region 434 within the image 128. The electronic device 102 may extract a contour 436 of the target region 434. The electronic device 102 may use many different approaches to extract the contours 436 of the target region 434. In one configuration, the electronic device 102 may scan the target regions 434 (which are filled with a certain color or pattern) at the beginning of the object removal process with the user's given object regions by horizontal or vertical scan lines to extract the contours 436. Automated approaches for finding contours 436 may also be used.

The electronic device 102 may then obtain one or more filling candidate pixels 422a-c. Each of the filling candidate pixels 422 may be on the contour 436 within the target region 434. In one configuration, the electronic device 102 may obtain every filling candidate pixel 422 that is along the contour 436 of the target region 434.

The electronic device 102 may obtain a candidate filling patch 410a-c for each filling candidate pixel 422. In one configuration, the electronic device 102 may include a predefined window size 124 used for each candidate filling patch 410a-c. The electronic device 102 may define the candidate filling patches 410a-c to each be centered at a filling candidate pixel 422.

The electronic device 102 may select a filling patch 410d from the candidate filling patches 410a-c. The selected filling patch 410d may be the candidate filling patch 410a-c with the maximum number of pixels within the filling patch source region 138. The electronic device 102 may determine a replacement patch 412 that is most similar to the selected filling patch 410d. The replacement patch 412 may be entirely located within the source region 432 of the image 128. In one configuration, the replacement patch 412 may be selected using sum of squared differences (SSD) or cross-correlation. The replacement patch 412 may be selected to maximize correlation between color information 114, grayscale information 116, texture information 118 and/or gradient information 120 between the filling patch source region 138 of the selected filling patch 410d and the replacement patch 412.

In one configuration, the replacement patch 412 may have the same window size 126 as the selected filling patch 410d. However, the replacement patch 412 may also be selected with a smaller or larger window size 126 than the window size 124 of the selected filling patch 410d. If the replacement patch 412 has a smaller or larger window size 126 than the window size 124 of the selected filling patch 410d, the resolution of the replacement patch 412 may be resized to match the resolution (i.e., window size 124) of the selected filling patch 410d.

The electronic device 102 may replace the selected filling patch 410d with the replacement patch 412. For example, each of the pixels within the selected filling patch 410d may be replaced with the corresponding pixels in the replacement patch 412. In one configuration, the electronic device 102 may simultaneously replace multiple target regions 434 specified by the user, thereby speeding up the process. For example, the electronic device 102 may replace multiple selected filling patches 410d of multiple target regions 434 at the same time.

The electronic device 102 may then determine 440 whether the image 128 includes additional filling candidate pixels 422. If the image 128 does not include additional filling candidate pixels 422, then the object 430 has been removed and the final result (i.e., the edited image 128) has been obtained. If the image 128 does include additional filling candidate pixels 422, the electronic device 102 may again separate the source region 432 and the target region 134 for the object 430.

Figure 5:
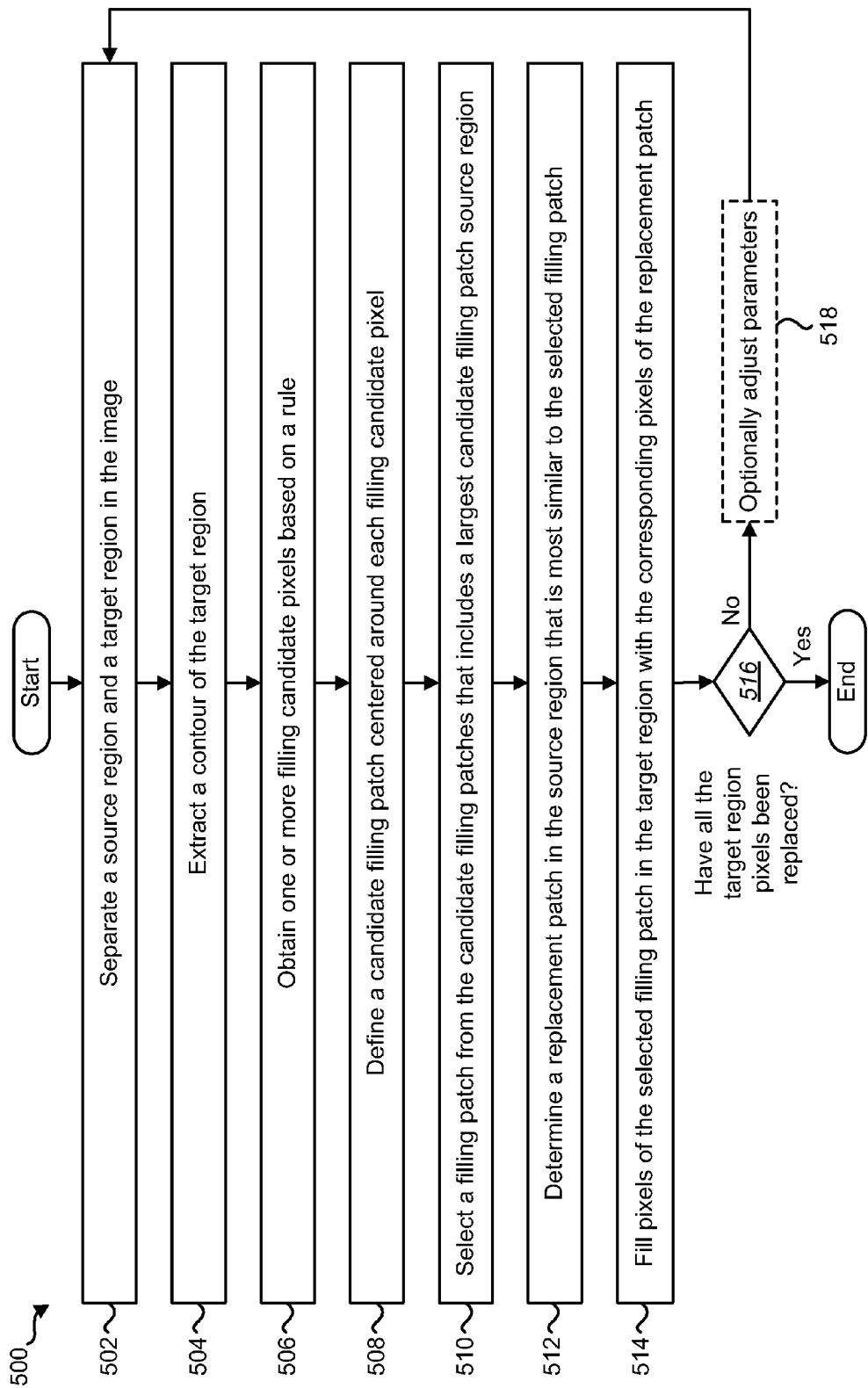
FIG. 5 is a flow diagram illustrating another method for removing an object from an image.

FIG. 5 is a flow diagram illustrating another method 500 for removing an object 130 from an image 128. The method 500 may be performed by an electronic device 102 that includes an object removal module 108. The electronic device 102 may separate 502 a source region 232 and a target region 234 in the image 128. In one configuration, the electronic device 102 may initially determine an indicated target region 234 based on user input. For example, the electronic device 102 may receive a touchscreen input and mark a target region 234 based on the input. The target region 234 indicates the object 130 areas that are expected to be removed in the image 128 and the source region 232 indicates areas other than the target region 234. The electronic device 102 may separate 502 the image 128 into the source region 232, which provides source pixels, and the target region 234 that needs to be filled.

The electronic device 102 may extract 504 a contour 136 of the target region 234. For example, the electronic device 102 may determine one or more pixels that border the target region 234 and source region 232. The electronic device 102 may obtain 506 one or more filling candidate pixels 122 based on a rule. The one or more filling candidate pixels 122 may include all pixels on the border of the target region 234. In some configurations, the one or more filling candidate pixels 122 may include an upscaled or decimated set of pixels corresponding to the border or contour 136 of the target region 234. For instance, the one or more filling candidate pixels 122 may include only half of the pixels corresponding to the border. Pixels on the border of the target region 234 that are also pixels on the edge of the image 128 may be excluded from the one or more filling candidate pixels 122.

In some configurations, the one or more filling candidate pixels 122 may be obtained 506 for each iteration of the object removal. For example, the electronic device 102 may initially obtain 506 the one or more filling candidate pixels 122 based on a received touchscreen input that indicates a selected target region 234. After one or more iterations, however, the one or more filling candidate pixels 122 may be reevaluated based on a selected filling patch 110 being replaced with a replacement patch 112. For example, after replacing a selected filling patch 110 with a replacement patch 112, the contour 136 may be extracted 504 again and the one or more filling candidate pixels 122 may be obtained 506 again. For instance, at the end of the first iteration, the filled pixels may be set as source pixels.

The electronic device 102 may define 508 a candidate filling patch 110 centered at each filling candidate pixel 122. A candidate filling patch 110 may have a window size 124. In some configurations, each candidate filling patch 110 may have the same window size 124.

The electronic device 102 may select 510 a filling patch 110 from the candidate filling patches 110 that includes a largest filling patch source region 138. For example, the electronic device 102 may compare the filling patch source region 138 of each candidate filling patch 110 to determine which filling patch source region 138 includes the largest number of pixels.

The electronic device 102 may determine 512 a replacement patch 112 in the source region 232 that is most similar to the filling patch source region 138 of the selected filling patch 110. For example, the electronic device 102 may find a replacement patch 112 within the source region 232 of the image 128 that best matches the selected filling patch 110. A suitable metric may be used in the matching process, such as sum of squared differences, normalized cross-correlation, absolute difference, distance, similarity and/or others. In some configurations, a best matching patch (i.e. the replacement patch 112) may be determined 512 by fast algorithms (described below in relation to FIG. 6.)

The matching procedure may use color differences and texture information during patch matching. For example, color, monochrome (i.e., grayscale information 116) and texture may be utilized for matching. One or more of the components used for matching may be weighted and/or the weights may be adjusted at one or more iterations. Determining 512 a replacement patch 112 in the source region may include computing one or more metrics such as Sum of Squared Differences (SSD), Normalized Cross-Correlation (NCC), absolute difference, distance, similarity and comparing the computed metrics.

Multiple comparisons may be performed when determining 512 the replacement patch 112. For example, different weights involving color and/or texture may be used. In one configuration, three sets of weights may be utilized, where one set of weights corresponds to an edgy image, another set of weights corresponds to a smooth image and another set of weights is normal or fixed. In one example, a first set of weights is used to select candidate replacement patches 112 and these candidate replacement patches 112 are further compared using other sets of weights to narrow down to a best matching patch. In some implementations, multiple comparisons may be performed in multi-scaled images 128. For example, candidate replacement patches 112 may be selected from a small scaled image 128 first, then these candidate replacement patches 112 may be refined to a best matching patch in the original image 128. The weights can also be input by users according to their experiences. One approach is that when the weight for texture is zero, only the color is considered in the matching process and when the weight for color is zero, only the texture is considered in the matching process. The color and texture differences may be normalized before the weighted sum is calculated for the matching process. The information of a grayscale image may also be utilized in the matching process. For example, differences of pixel grayscale values may be calculated and matched with one or more kinds of metrics. The grayscale differences can be weighted with color and texture in the matching process.

The electronic device 102 may fill 514 the pixels of the selected filling patch 110 in the target region 234 with the corresponding pixels of the replacement patch 112. For example, the electronic device 102 may copy the corresponding pixels of the replacement patch 112 to the target region 234 pixels of the selected filling patch 110.

The electronic device 102 may determine 516 whether all of the target region 234 pixels have been replaced. For example, the electronic device 102 checks whether the target region 234 has been completely filled. If all of the target region 234 pixels have been replaced, then the final result image 128 is obtained and operation may end. For example, the final result image 128 may be the edited picture in which the objects 230 have been removed and the background areas have been recovered. However, if not all of the target region 234 pixels are filled, the electronic device 102 may repeat the process until all pixels in the target region 234 have been replaced. Accordingly, the electronic device 102 may again separate 502 the source region 232 and the target region 234 in the image 128.

In some configurations, the electronic device 102 may optionally adjust 518 one or more parameters during iterations of the object removal method. For example, the window size 124 of the candidate filling patches 110, the window size 126 of the replacement patch 112 and the number of filling candidate pixels 122 used may be increased or decreased.

Some advantages of the approaches herein include that the object removal method is simple, fast and suitable for mobile devices. The object removal method may make full use of GPGPU computing on an OpenCL platform in some configurations. Furthermore, the object removal method makes it possible to create object removal functionality on mobile platforms. Known approaches (which may be applied to desktop computers) may be very slow or impossible to run on mobile platforms.

Object removal approaches can be divided into two categories, including gradient domain algorithms and pixels domain algorithms. Gradient domain approaches convert color images into gradient images and perform object removal operations in the gradient domain. The final resulting color images 128 are recovered from the gradient images by solving Poisson equations. This kind of algorithm can obtain high-quality resulting images 128. However, it is computationally intensive and requires solving a large linear equation system. Furthermore, it does not apply well to mobile platforms. The algorithm disclosed herein does not belong to this category.

Pixel domain approaches perform object removal operations on the pixel domain (color domain). Compared with gradient domain approaches, pixel domain approaches are simple and do not need to solve a large linear equation system. This kind of approach is more suitable to mobile applications. The systems and methods disclosed herein may belong to this category.

Table 1 provides a comparison between a known approach and the approaches disclosed herein.

TABLE 1

| Item | Known Approach | Approach Disclosed Herein |
|---|---|---|
| 1 | | Separate the image into the source region which provides source pixels and the target region that needs to be filled. |
| 2 | | Find a pixel in the target region that has a maximum number of source pixels in the neighborhood. Set the pixel as filling candidate. |
| 3 | Computing a fill priority for each point on a fill front of a destination region in an image. | None |
| 4 | | Define a filling patch centered at the filling candidate pixel with a given window size and find a best matching patch for the filling patch in the source region of the image. The patch matching process computes and compares with some kind of metric like Sum of Squared Differences (SSD), Normalized Cross-Correlation (NCC), absolute difference, distance, similarity and/or others. During the patch matching process, texture and/or gradient information of the image are used to obtain good results. Multi-level matching process may also be applied to speed up the approach. |
| 5 | Filling a destination tile associated with a point on the fill front having the highest fill priority associated with the 30 fill front. | Fill the filling patch with the best matching patch. |
| 6 | Defining a new fill front of the destination region, excluding the filled destination file. | Set the filled pixels as source pixels and repeat above steps until the target region is filled. |
| 7 | Computing a fill priority for each point on the new fill front; and filling a destination tile associated with a point on the new fill front having the highest fill priority associated with the new fill front; wherein the operation of computing a fill priority for each point on the fill front comprises: computing a strength factor for a point on the fill front, wherein the strength factor represents a strength of an isophote intersecting the fill front at the point. | None |
| 8 | Computing the fill priority for the point on the fill front based on the strength factor | None |

From the comparison above, it can be observed that steps 1, 2 and 4 are new, and steps 2 and 4 may be particularly beneficial. Step 2 gives guidance for the filling direction. Without this step, the final result will not have a continuous texture and the patches of the scene will not continue. No other known approach has this step. Step 4 is also very beneficial. It finds the best replacement patch 112 for the selected filling patch 110. Existing approaches may be too complicated to be applied to mobile platforms because of computational complexity, or they may not give good results. However, the systems and methods disclosed herein may combine simple metrics with a consideration of texture information 118 and/or gradient information 120. One of the main benefits here is that better results can be obtained with simple computing. Furthermore, good texture continuity can be obtained in the final results, which is very beneficial.

The systems and methods disclosed herein may also be accelerated with GPGPUs on mobile OpenCL platforms in some configurations. The GPGPU acceleration may also enable application of the algorithm on mobile platforms.

Figure 6:
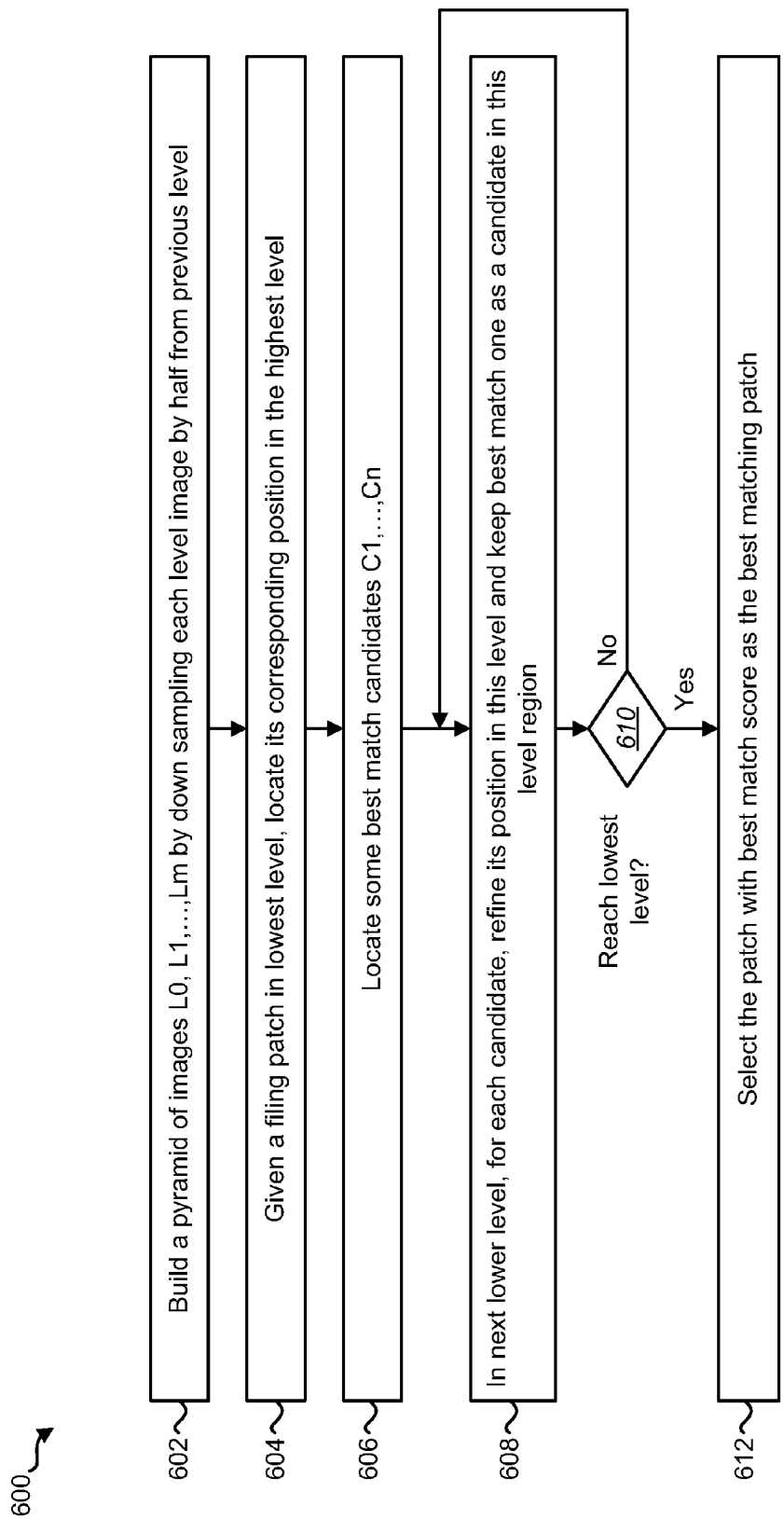
FIG. 6 is a flow diagram illustrating a method for fast best patch matching.

FIG. 6 is a flow diagram illustrating a method 600 for fast best patch matching. In particular, the method 600 illustrated in FIG. 6 may be one approach for determining 512 a replacement patch 112 in the source region 232 that is most similar to the selected filling patch 110. The method 600 may be performed by an electronic device 102 that includes an object removal module 108.

Given an image 128 with a source region 232 and a target region 234, the electronic device 102 may build 602 a pyramid of down-sampled images L0, L1 ..., Lm. In the pyramid of down-sampled images, the image in the first level L0 is down sampled by half to obtain the image in the second level L1. Likewise, the image in the second level L1 is down sampled by half to obtain the image in the next level.

Given a filling patch A in the lowest level image L0, the electronic device 102 may locate 604 a corresponding patch B in the highest level image Lm. The electronic device 102 may also locate 606 a number of best matching patches of B in the highest level image Lm and denote these candidate patches as C1, C2, ..., Cn.

For each candidate patch located in Lm (e.g., Cn), the electronic device 102 may refine 608 the corresponding position of the candidate patch in level Lm by examining a number of surrounding patches around Cn and keeping the best matching one as D1. After refining 608 the positions for each of the candidate patches in Lm, the electronic device 102 may obtain a number of best matching candidates D1, D2, ..., Dn in the level above Lm (e.g., L2). The electronic device 102 may determine 610 whether the lowest level (i.e., level L0) has been reached. The electronic device 102 may repeat a step from high level to low level until the original image is reached. The electronic device 102 may then select 612 the replacement patch 112 with the best match, which may be the one with a highest match score among surviving candidates.

Figure 7:
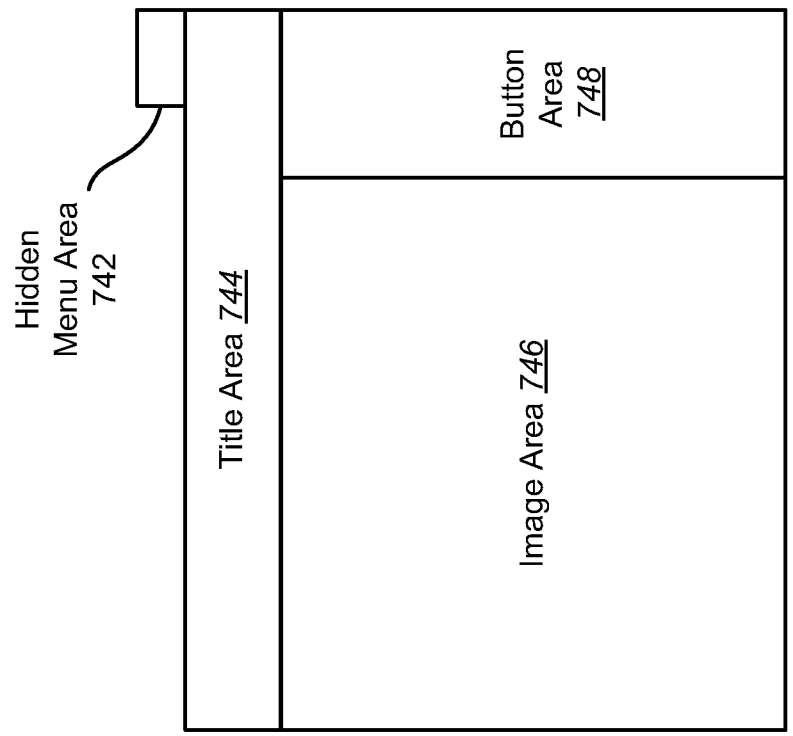
FIG. 7 is a block diagram illustrating one example of a user interface that may be implemented in accordance with the systems and methods disclosed herein.

FIG. 7 is a block diagram illustrating one example of a user interface 706 that may be implemented in accordance with the systems and methods disclosed herein. In particular, FIG. 7 shows one example layout of the user interface 706 of the object removal system. The user interface 706 may be located on an electronic device 102. There are four areas of the user interface 706, including the title area 744, the image area 746, the button area 748, and the hidden menu area 742.

The title area 744 is used for display of the title of the system. The image area 746 is used for displaying the input, intermediate and final result images. The button area 748 is designed for buttons for different operations in object removal. The hidden menu area 742 is designed for menu items of operations and parameter settings.

The objects 130 that need to be removed may be selected by drawing the object 130 regions with a user's fingers with certain colors such as red, green, or blue. The object removal module 108 may then recover the background in the drawing areas.

The buttons in the button area 748 may be re-drawable. For example, their color may be black when they are enabled and gray when they are disabled. The menu in the hidden menu area 742 may be hidden. When a finger touches the hidden menu area 742, a hidden pull-down menu may appear. The user can select a menu item for a corresponding operation or parameter settings. The design described herein may be suitable to many types of electronic devices 102, including wireless communication devices that use the Android operating system.

Figure 8:
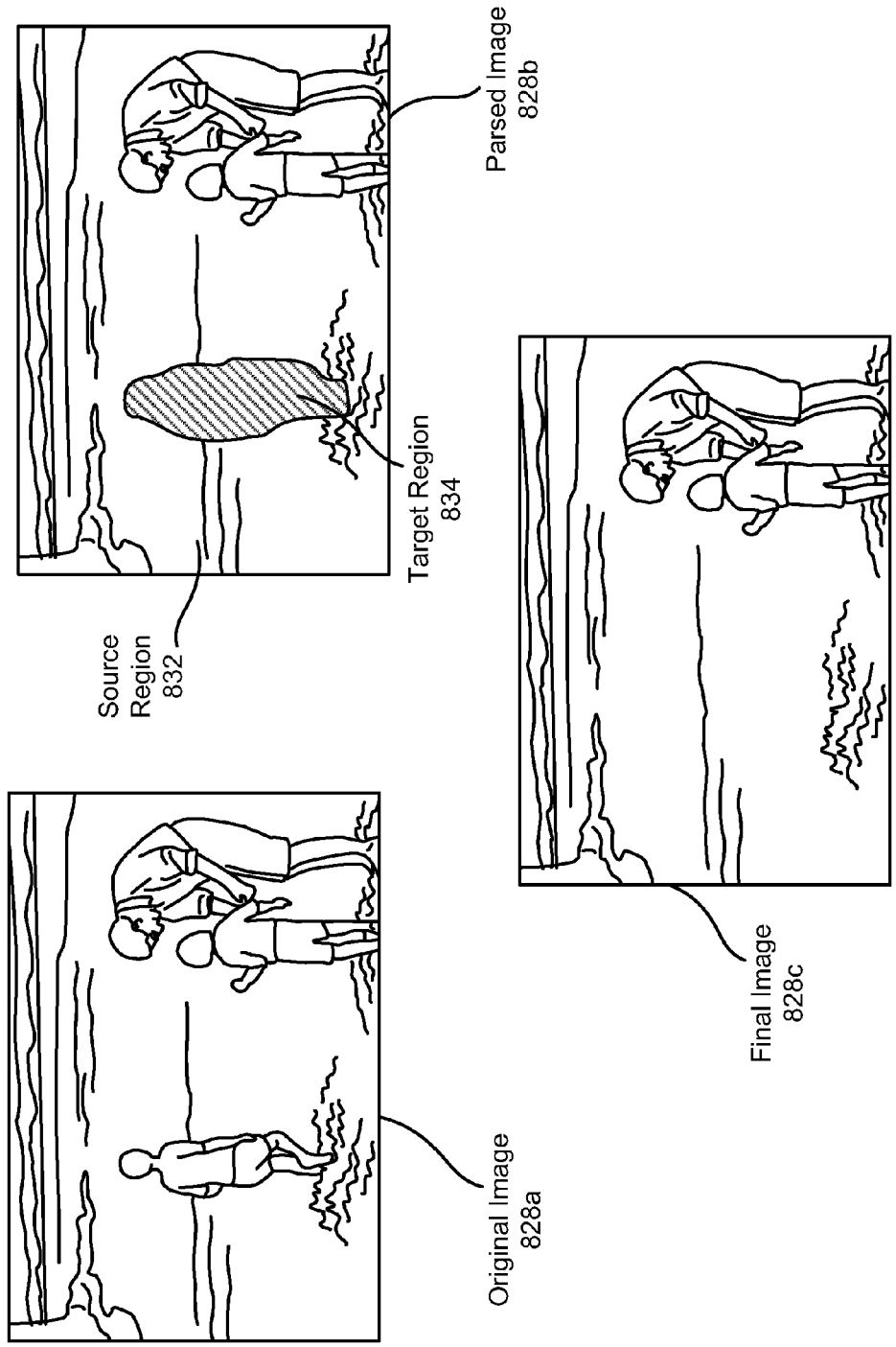
FIG. 8 illustrates one example of the removal of an object from an image.

FIG. 8 illustrates one example of the removal of an object 130 from an image 828a-c. An original image 828a is shown. In a parsed image 828b, the source region 832 and the target region 834 have been identified. The target region 834 is a portion of the parsed image 828b that a user has indicated to remove from the parsed image 828b. A final image 828c is also illustrated. The target region 834 has been removed in the final image 828c and the background behind the target region 834 has been filled.

Figure 9:
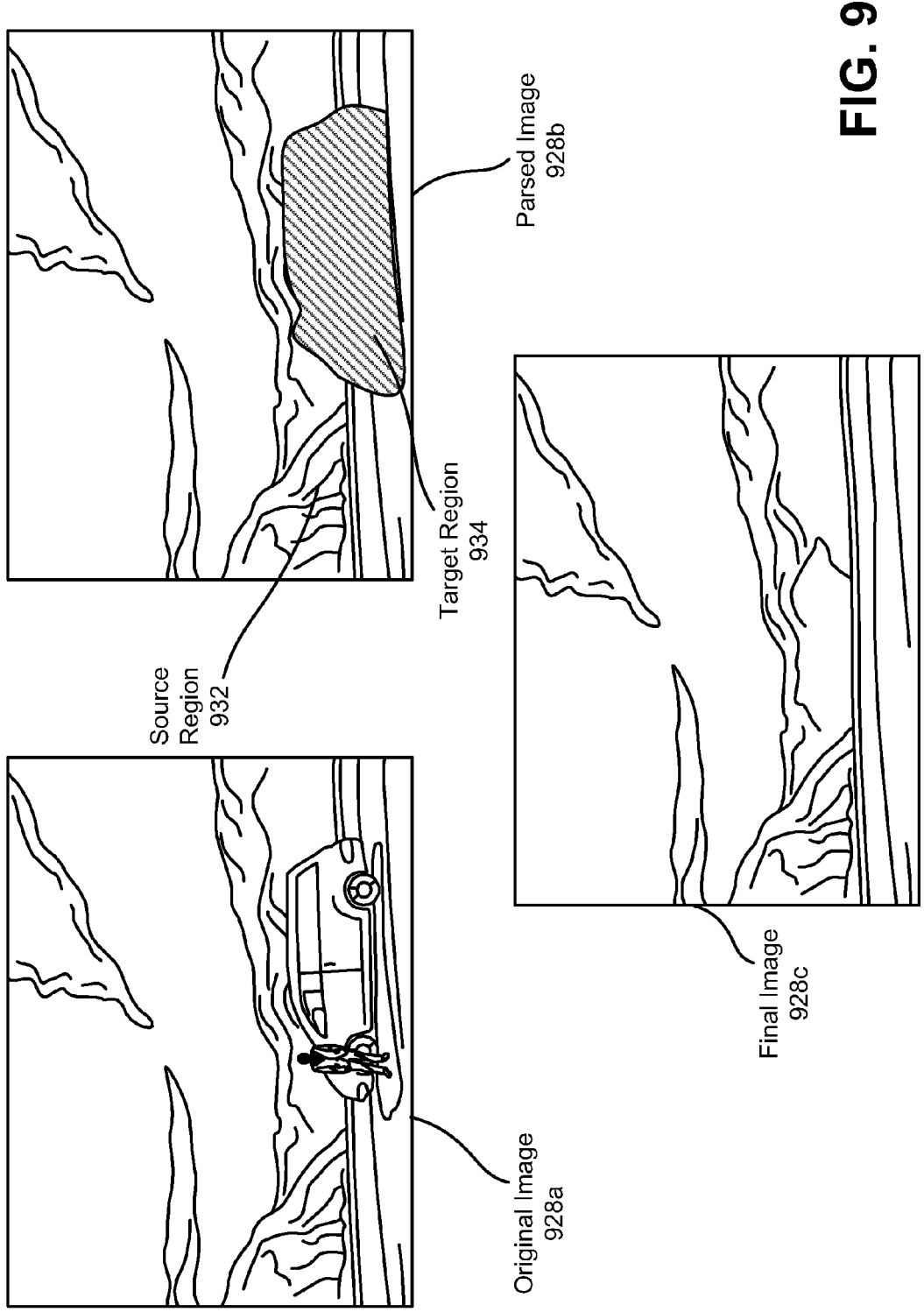
FIG. 9 illustrates another example of the removal of an object from an image.

FIG. 9 illustrates another example of the removal of an object 130 from an image 928a-c. An original image 928a is shown. In a parsed image 928b, the source region 932 and the target region 934 have been identified. The target region 934 is a portion of the parsed image 928b that a user has indicated to remove from the parsed image 928b. A final image 928c is also illustrated. The target region 934 has been removed in the final image 928c and the background behind the target region 934 has been filled.

Figure 10:
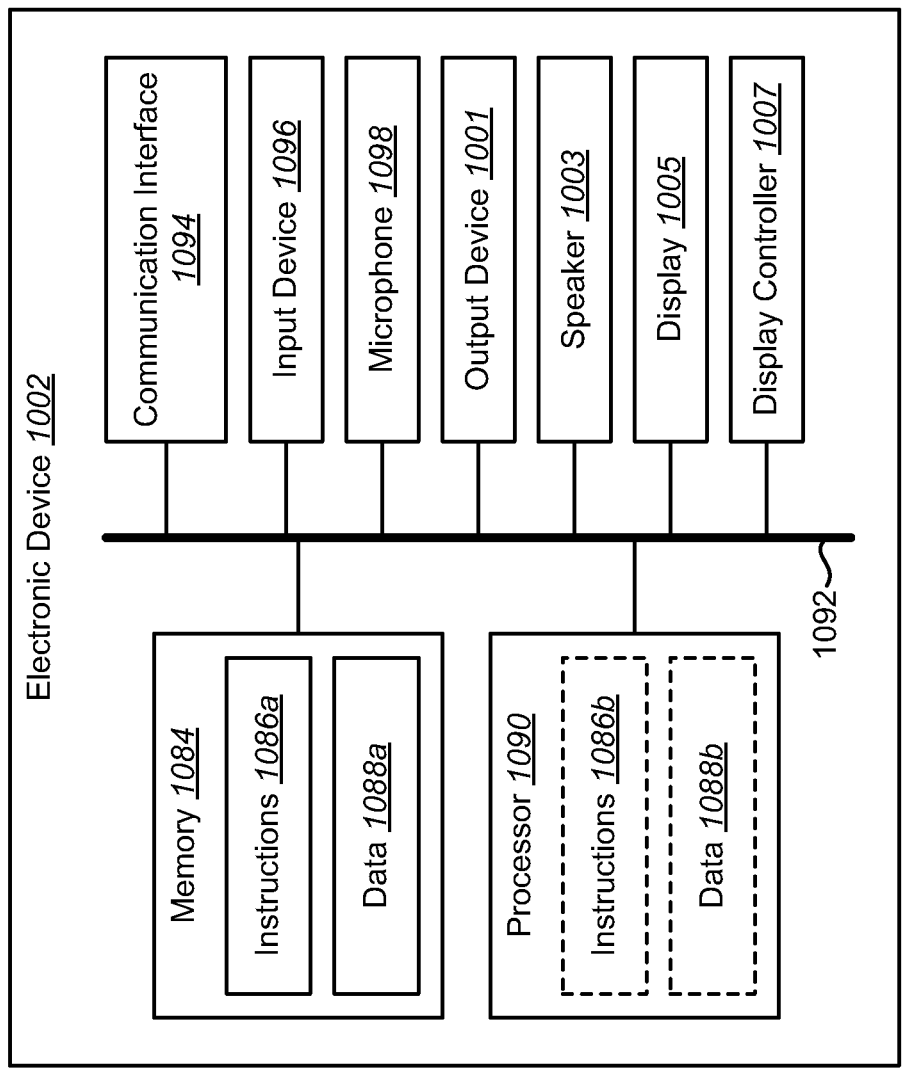
FIG. 10 illustrates various components that may be utilized in an electronic device.

FIG. 10 illustrates various components that may be utilized in an electronic device 1002. The illustrated components may be located within the same physical structure or in separate housings or structures. The electronic device 1002 described in connection with FIG. 10 may be implemented in accordance with one or more of the electronic devices described herein. The electronic device 1002 includes a processor 1090. The processor 1090 may be a general purpose single- or multi-chip microprocessor (e.g., an ARM), a special purpose microprocessor (e.g., a digital signal processor (DSP)), a microcontroller, a programmable gate array, etc. The processor 1090 may be referred to as a central processing unit (CPU). Although just a single processor 1090 is shown in the electronic device 1002 of FIG. 10, in an alternative configuration, a combination of processors (e.g., an ARM and DSP) could be used.

The electronic device 1002 also includes memory 1084 in electronic communication with the processor 1090. That is, the processor 1090 can read information from and/or write information to the memory 1084. The memory 1084 may be any electronic component capable of storing electronic information. The memory 1084 may be random access memory (RAM), read-only memory (ROM), magnetic disk storage media, optical storage media, flash memory devices in RAM, on-board memory included with the processor, programmable read-only memory (PROM), erasable programmable read-only memory (EPROM), electrically erasable PROM (EEPROM), registers, and so forth, including combinations thereof.

Data 1088a and instructions 1086a may be stored in the memory 1084. The instructions 1086a may include one or more programs, routines, sub-routines, functions, procedures, etc. The instructions 1086a may include a single computer-readable statement or many computer-readable statements. The instructions 1086a may be executable by the processor 1090 to implement one or more of the methods, functions and procedures described above. Executing the instructions 1086a may involve the use of the data 1088a that is stored in the memory 1084. FIG. 10 shows some instructions 1086b and data 1088b being loaded into the processor 1090 (which may come from instructions 1086a and data 1088a).

The electronic device 1002 may also include one or more communication interfaces 1094 for communicating with other electronic devices. The communication interfaces 1094 may be based on wired communication technology, wireless communication technology, or both. Examples of different types of communication interfaces 1094 include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter, and so forth.

The electronic device 1002 may also include one or more input devices 1096 and one or more output devices 1001. Examples of different kinds of input devices 1096 include a keyboard, mouse, microphone, remote control device, button, joystick, trackball, touchpad, lightpen, etc. For instance, the electronic device 1002 may include one or more microphones 1098 for capturing acoustic signals. In one configuration, a microphone 1098 may be a transducer that converts acoustic signals (e.g., voice, speech) into electrical or electronic signals. Examples of different kinds of output devices 1001 include a speaker, printer, etc. For instance, the electronic device 1002 may include one or more speakers 1003. In one configuration, a speaker 1003 may be a transducer that converts electrical or electronic signals into acoustic signals. One specific type of output device which may be typically included in an electronic device 1002 is a display device 1005. Display devices 1005 used with configurations disclosed herein may utilize any suitable image projection technology, such as a cathode ray tube (CRT), liquid crystal display (LCD), light-emitting diode (LED), gas plasma, electroluminescence, or the like. A display controller 1007 may also be provided for converting data stored in the memory 1084 into text, graphics, and/or moving images (as appropriate) shown on the display device 1005.

The various components of the electronic device 1002 may be coupled together by one or more buses, which may include a power bus, a control signal bus, a status signal bus, a data bus, etc. For simplicity, the various buses are illustrated in FIG. 10 as a bus system 1092. It should be noted that FIG. 10 illustrates only one possible configuration of an electronic device 1002. Various other architectures and components may be utilized.

In the above description, reference numbers have sometimes been used in connection with various terms. Where a term is used in connection with a reference number, this may be meant to refer to a specific element that is shown in one or more of the Figures. Where a term is used without a reference number, this may be meant to refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

It should be noted that one or more of the features, functions, procedures, components, elements, structures, etc., described in connection with any one of the configurations described herein may be combined with one or more of the functions, procedures, components, elements, structures, etc., described in connection with any of the other configurations described herein, where compatible. In other words, any compatible combination of the functions, procedures, components, elements, etc., described herein may be implemented in accordance with the systems and methods disclosed herein.

The functions described herein may be stored as one or more instructions on a processor-readable or computer-readable medium. The term "computer-readable medium" refers to any available medium that can be accessed by a computer or processor. By way of example, and not limitation, such a medium may comprise RAM, ROM, EEPROM, flash memory, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for removing an object from an image, comprising:
    separating, by an electronic device, the image into a source region and a target region comprising the object to be removed;
    determining a set of pixels corresponding to a contour of the target region, wherein the contour is recalculated at each iteration;
    obtaining, by the electronic device, one or more filling candidate pixels;
    obtaining, by the electronic device, multiple filling patches, wherein each filling patch is centered at a filling candidate pixel; and
    selecting, by the electronic device, a filling patch for replacement.

2. The method of claim 1, wherein the selected filling patch comprises a largest number of pixels in a filling patch source region of the selected filling patch.

3. The method of claim 1, further comprising:
    determining a replacement patch that is most similar to the selected filling patch; and
    replacing the target region portion of the selected filling patch with the corresponding part of the replacement patch.

4. The method of claim 3, wherein the replacement patch is selected to maximize correlation of both color information and texture information between the replacement patch and the selected filling patch.

5. The method of claim 3, wherein the replacement patch is selected to maximize correlation between both grayscale information and gradient information between the replacement patch and the selected filling patch.

6. The method of claim 3, further comprising iterating the method if all target region pixels are not filled.

7. The method of claim 3, wherein the replacement patch is determined using a fast best patch matching algorithm.

8. The method of claim 3, wherein the replacement patch is determined using one or more components that are weighted, wherein the components comprise color information, grayscale information, texture information and gradient information.

9. The method of claim 8, wherein the components are weighted corresponding to an edgy image, a smooth image and a normal image.

10. The method of claim 1, further comprising adjusting a resolution at one or more iterations of the method.

11. The method of claim 1, wherein the source region and the target region are separated based on a touchscreen input.

12. The method of claim 1, wherein the contour of the target region comprises a decimated set of pixels corresponding to the contour.

13. The method of claim 1, wherein the contour of the target region comprises an upscaled set of pixels corresponding to the contour.

14. The method of claim 1, wherein the target region is selected using a user interface that comprises a hidden pull-down menu.

15. An electronic device, comprising:
circuitry for separating an image into a source region and a target region comprising an object to be removed;
circuitry for determining a set of pixels corresponding to a contour of the target region, wherein the contour is recalculated at each iteration;
circuitry for obtaining one or more filling candidate pixels;
circuitry for obtaining multiple filling patches, wherein each filling patch is centered at a filling candidate pixel; and
circuitry for selecting a filling patch for replacement.

16. The electronic device of claim 15, wherein the selected filling patch comprises a largest number of pixels in a filling patch source region of the selected filling patch.

17. The electronic device of claim 15, further comprising:
circuitry for determining a replacement patch that is most similar to the selected filling patch; and
circuitry for replacing the target region portion of the selected filling patch with the corresponding part of the replacement patch.

18. The electronic device of claim 17, wherein the replacement patch is selected to maximize correlation of both color information and texture information between the replacement patch and the selected filling patch.

19. The electronic device of claim 17, wherein the replacement patch is selected to maximize correlation between both grayscale information and gradient information between the replacement patch and the selected filling patch.

20. The electronic device of claim 17, wherein the replacement patch is determined using a fast best patch matching algorithm.

21. The electronic device of claim 17, wherein the replacement patch is determined using one or more components that are weighted, wherein the components comprise color information, grayscale information, texture information and gradient information.

22. The electronic device of claim 21, wherein the components are weighted corresponding to an edgy image, a smooth image and a normal image.

23. The electronic device of claim 15, further comprising circuitry configured for adjusting a resolution at one or more iterations.

24. The electronic device of claim 15, wherein the source region and the target region are separated based on a touchscreen input.

25. The electronic device of claim 15, wherein the contour of the target region comprises a decimated set of pixels corresponding to the contour.

26. The electronic device of claim 15, wherein the contour of the target region comprises an upscaled set of pixels corresponding to the contour.

27. The electronic device of claim 15, wherein the target region is selected using a user interface that comprises a hidden pull-down menu.

28. An apparatus, comprising:
means for separating an image into a source region and a target region comprising an object to be removed;
means for determining a set of pixels corresponding to a contour of the target region, wherein the contour is recalculated at each iteration;
means for obtaining one or more filling candidate pixels;
means for obtaining multiple filling patches, wherein each filling patch is centered at a filling candidate pixel; and
means for selecting a filling patch for replacement.

29. The apparatus of claim 28, wherein the selected filling patch comprises a largest number of pixels in a filling patch source region of the selected filling patch.

30. The apparatus of claim 28, further comprising:
means for determining a replacement patch that is most similar to the selected filling patch; and
means for replacing the target region portion of the selected filling patch with the corresponding part of the replacement patch.

31. The apparatus of claim 30, wherein the replacement patch is selected to maximize correlation of both color information and texture information between the replacement patch and the selected filling patch.

32. The apparatus of claim 30, wherein the replacement patch is selected to maximize correlation between both grayscale information and gradient information between the replacement patch and the selected filling patch.

33. The apparatus of claim 30, wherein the replacement patch is determined using a fast best patch matching algorithm.

34. The apparatus of claim 30, wherein the replacement patch is determined using one or more components that are weighted, wherein the components comprise color information, grayscale information, texture information and gradient information.

35. The apparatus of claim 34, wherein the components are weighted corresponding to an edgy image, a smooth image and a normal image.

36. The apparatus of claim 28, further comprising adjusting a resolution at one or more iterations.

37. The apparatus of claim 28, wherein the source region and the target region are separated based on a touchscreen input.

38. The apparatus of claim 28, wherein the contour of the target region comprises a decimated set of pixels corresponding to the contour.

39. The apparatus of claim 28, wherein the contour of the target region comprises an upscaled set of pixels corresponding to the contour.

40. The apparatus of claim 28, wherein the target region is selected using a user interface that comprises a hidden pull-down menu.

41. A computer-program product comprising a non-transitory tangible computer-readable medium having instructions thereon, the instructions comprising:

code for causing an electronic device to separate an image into a source region and a target region comprising an object to be removed;
code for determining a set of pixels corresponding to a contour of the target region, wherein the contour is recalculated at each iteration;
code for causing the electronic device to obtain one or more filling candidate pixels;
code for causing the electronic device to obtain multiple filling patches, wherein each filling patch is centered at a filling candidate pixel; and
code for causing the electronic device to select a filling patch for replacement.

42. The computer-program product of claim 41, wherein the selected filling patch comprises a largest number of pixels in a filling patch source region of the selected filling patch.

43. The computer-program product of claim 42, further comprising:
code for causing the electronic device to determine a replacement patch that is most similar to the selected filling patch; and
code for causing the electronic device to replace the target region portion of the selected filling patch with the corresponding part of the replacement patch.

* * * * *